US009577546B2

(12) United States Patent
Teren et al.

(10) Patent No.: US 9,577,546 B2
(45) Date of Patent: Feb. 21, 2017

(54) POWER CONVERTER WITH SELF-DRIVEN SYNCHRONOUS RECTIFIER CONTROL CIRCUITRY

(71) Applicant: Power-One, Inc., Camarillo, CA (US)

(72) Inventors: Andrej Teren, Zilina (SK); Marian Vranka, Dubnica nad Vahom (SK); Martin Pietka, Dubnica nad Vahom (SK); Lee Tai Keung, Ma on Shan (HK)

(73) Assignee: PAI CAPITAL LLC, Santa Clara, CA (US)

( * ) Notice: Subject to any disclaimer, the term of this patent is extended or adjusted under 35 U.S.C. 154(b) by 358 days.

(21) Appl. No.: 14/182,109

(22) Filed: Feb. 17, 2014

(65) Prior Publication Data

US 2014/0268956 A1 Sep. 18, 2014

Related U.S. Application Data

(60) Provisional application No. 61/787,923, filed on Mar. 15, 2013.

(51) Int. Cl.
*H02M 7/219* (2006.01)

(52) U.S. Cl.
CPC .... *H02M 7/219* (2013.01); *H02M 2007/2195* (2013.01); *Y02B 70/1408* (2013.01)

(58) Field of Classification Search
CPC ...... H02M 1/081; H02M 1/4208; H02M 7/00; H02M 7/04; H02M 3/33592; H02M 7/217;

(Continued)

(56) References Cited

U.S. PATENT DOCUMENTS 5,510,972 A * 4/1996 Wong .................... H02M 7/219
363/125
6,181,588 B1 1/2001 Kates et al.
(Continued)

FOREIGN PATENT DOCUMENTS

EP 2400644 A1 12/2010
JP 2008061403 A 3/2008
KR 20060091920 A 8/2006

OTHER PUBLICATIONS

Huber et al., "Performance Evaluation of Synchronous Rectification in Front-End Full-Bridge Rectifiers", in Applied Power Electronics Conference and Exposition (APEC). Twenty-Seventh Annual IEEE, Orlando, FL, USA. Feb. 5-9, 2012, pp. 310-316.

(Continued)

*Primary Examiner* — Jessica Han
(74) *Attorney, Agent, or Firm* — Patterson Intellectual Property Law, PC; Mark J. Patterson; Gary L. Montle

(57) ABSTRACT

An AC-DC power converter is provided with two pairs of self-driven synchronous rectifier switches in addition to, or in place of, diode bridge rectifiers for boosting efficiency and reducing cost. An AC sensing circuit is coupled to AC input terminals, and a DC level shifting circuit applies a DC offset to an AC input signal received via the sensing circuit. A comparator circuit determines positive and negative half waves of the AC input signal relative to the DC offset value. Gate drive signals are provided for driving a first set of parallel rectifier switches during a positive half cycle of the AC input signal, and for driving a second and opposing pair of parallel rectifier switches during a negative half cycle of the AC input signal. In an embodiment, high side gate drive signals may be electrically isolated from the active rectifier control circuitry.

14 Claims, 9 Drawing Sheets

(58) Field of Classification Search
CPC . H02M 7/219; H02M 2007/2195; H02M 7/23
See application file for complete search history.

(56) References Cited

U.S. PATENT DOCUMENTS

| | | |
|---|---|---|
| 6,490,183 B2 | 12/2002 | Zhang |
| 6,822,882 B1 | 11/2004 | Jacobs et al. |
| 7,269,038 B2 | 9/2007 | Shekhawat et al. |
| 7,330,360 B2 | 2/2008 | Lee et al. |
| 7,362,598 B2 | 4/2008 | Schaible et al. |
| 7,843,708 B2 | 11/2010 | Seong |
| 7,885,086 B2 | 2/2011 | Wang et al. |
| 2006/0133116 A1 | 6/2006 | Schaible et al. |
| 2007/0058402 A1* | 3/2007 | Shekhawat ............. H02M 1/42 363/89 |
| 2010/0046264 A1 | 2/2010 | Ho et al. |
| 2012/0274132 A1 | 11/2012 | Membretti et al. |
| 2013/0176758 A1* | 7/2013 | Tseng ................... H02M 7/219 363/89 |
| 2015/0180330 A1* | 6/2015 | Ye ....................... H02M 1/4208 363/126 |

OTHER PUBLICATIONS

International Search Report in corresponding International Application No. PCT/US2014/025886, dated Jul. 7, 2014, 12 pp.

\* cited by examiner

POWER CONVERTER WITH SELF-DRIVEN SYNCHRONOUS RECTIFIER CONTROL CIRCUITRY

CROSS-REFERENCES TO RELATED APPLICATIONS

This application claims benefit of the following patent application which is hereby incorporated by reference: U.S. Provisional Patent Application No. 61/787,923, filed Mar. 15, 2013.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates generally to switch-mode power converters. More particularly, the present invention relates to power supplies using synchronous rectifier circuitry in place of a diode bridge. Even more particularly, the present invention relates to control circuitry for driving synchronous rectifiers according to input voltage phase.

Various switch-mode power converters as conventionally known in the art include bridge rectifiers to convert an alternating-current (AC) input voltage into a rectified direct-current (DC) voltage. However, losses on such a bridge rectifier may be significant. The voltage drop for typical bridge diodes may range from about 0.7 volts to about 1.0 volts. Hence, the diode voltage drop may be as much as 2 volts as in a bridge rectifier there are two diodes conducting for every half cycle of the AC input signal.

BRIEF SUMMARY OF THE INVENTION

In a switch-mode AC-DC power converter according to the present invention, diode voltage drop losses may be significantly reduced by coupling four metal-oxide-semiconductor field-effect transistor (MOSFET) switching elements with the diodes in a conventional bridge rectifier, or by replacing the diodes with MOSFETs outright, along with control circuitry for driving the parallel MOSFET configurations.

A simple loss comparison between bridge rectifiers against parallel MOSFETs may be provided as follows, with certain exemplary assumptions such as a rectifier average output current of 5 amps, a rectifier diode drop of 1 volt/diode, and a MOSFET $R_{DS(ON)}$ of 60 mΩ. With these parameters, the power loss for diodes is $(2 \times V_f \times I_{avg}) = 10$ W, while the power loss for MOSFETs is $(2 \times R_{DS(ON)} \times I^2 \text{ rms}) = 3.7$ W. Therefore, it may easily be demonstrated that a parallel MOSFET synchronous rectifier configuration of the present invention results in substantially lower losses and boosts the overall efficiency of the power converter.

Briefly stated, various embodiments of a power converter according to the present invention include a first AC input terminal coupled between first and second synchronous rectifier switching elements, the first and second synchronous rectifier switching elements coupled across first and second DC output terminals. A second AC input terminal is coupled between third and fourth synchronous rectifier switching elements, the third and fourth synchronous rectifier switching elements being coupled across the first and second DC output terminals. An AC input sensing circuit is coupled to the AC input terminals. A DC level shifting circuit applies a DC offset to an AC input signal received via the sensing circuit. Switching control circuitry receives the AC input signal with the DC offset and provides signals for driving the first and fourth synchronous rectifier switching elements during a positive half cycle of the AC input signal, and signals for driving the second and third synchronous rectifier switching elements during a negative half cycle of the AC input signal.

In one aspect of the present invention, the positive half-cycle and the negative half-cycle of the AC input signal are substantially defined with respect to the DC offset.

In another aspect, the synchronous rectifier switching elements are MOSFET rectifiers having parallel diodes.

In one embodiment, the switching control circuitry further includes a first comparator circuit that compares the AC input signal with the DC offset to a first reference voltage and generates a first control signal for turning on the first and fourth switching elements when the input signal is greater than the first reference voltage. A second comparator circuit compares the AC input signal with the DC offset to a second reference voltage and generates a second control signal for turning on the second and third switching elements when the input signal is less than the second reference voltage.

In one aspect of this embodiment, the first and second reference voltages are substantially equal to the DC offset.

In another aspect of this embodiment, a first high side driver circuit is provided to receive the first control signal and to generate an electrically isolated gate drive signal for turning on the first switching element. A second high side driver circuit is provided to receive the second control signal and to generate an electrically isolated gate drive signal for turning on the third switching element. A first buffer drive circuit is further coupled to receive the first control signal and to generate a gate drive signal for turning on the fourth switching element. A second buffer drive circuit is coupled to receive the second control signal and to generate a gate drive signal for turning on the second switching element.

In one embodiment of the power converter according to the present invention, a first comparator switching element is coupled to the AC sensing circuit and configured to be turned on during a positive half cycle of the AC input signal. A second comparator switching element is coupled to the sensing circuit and is configured to be turned on during a negative half cycle of the AC input signal. A first driver circuit generates drive signals to turn on and off the first and second synchronous rectifier switching elements in accordance with on-states of the first and second comparator switching elements, respectively. A second driver circuit generates drive signals to turn on and off the third and fourth synchronous rectifier switching elements in accordance with on-states of the second and first comparator switching elements, respectively.

In one aspect of such an embodiment, a threshold value for the comparator switching elements may define a DC offset for referencing the positive and negative half cycles of the AC input signal.

In another aspect, the AC input sensing circuit may include a first pair of resistors coupled on a first end to the first AC input terminal and on a second end to circuit ground, and a second pair of resistors coupled on a first end to the second AC input terminal and on a second end to circuit ground.

In another aspect, the first comparator switching element has a source terminal coupled to circuit ground and a gate terminal coupled to a drain terminal of the second comparator switching element and further to a node between the second pair of resistors. A second comparator switching element has a source terminal coupled to circuit ground and a gate terminal coupled to a drain terminal of the first comparator switching element and further to a node between the first pair of resistors.

In another aspect of any of the embodiments described above, a diode bridge rectifier may further be coupled on a first end between the AC input terminals and on a second end between the first and second DC output terminals.

DETAILED DESCRIPTION OF THE INVENTION

Figure 1:
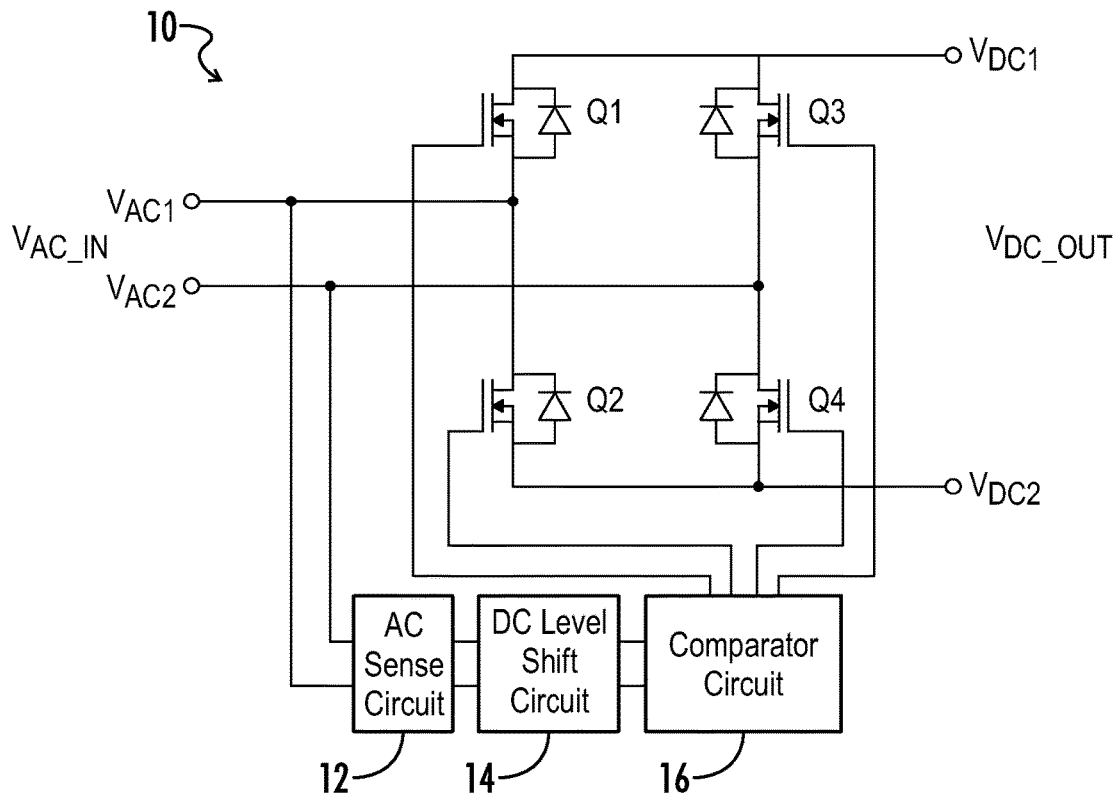
FIG. 1 is a circuit block diagram representing an exemplary power converter and active bridge control circuitry according to an embodiment of the present invention.

Referring generally to FIGS. 1-12, various embodiments of a power converter with an active bridge MOSFET rectifier, active bridge control circuitry and methods of operation may now be described. Where the various figures may describe embodiments sharing various common elements and features with other embodiments, similar elements and features are given the same reference numerals and redundant description thereof may be omitted below.

Referring first to FIG. 1, an embodiment of a power converter 10 is shown coupled on a first end to first and second AC input terminals $V_{AC1}$ and $V_{AC2}$ and on a second end to first and second DC terminals $V_{DC1}$ and $V_{DC2}$. A first active rectifier bridge includes first and second switching elements Q1 and Q2 as synchronous rectifiers coupled in series across the first and second DC terminals, with the first AC terminal $V_{AC1}$ coupled to a node between the first and second switching elements. A second active rectifier bridge includes third and fourth switching elements Q3 and Q4 as synchronous rectifiers coupled in series across the first and second DC terminals $V_{DC1}$ and $V_{DC2}$ and in parallel with the first active rectifier bridge, with the second AC terminal $V_{AC2}$ coupled to a node between the third and fourth switching elements Q3, Q4. The synchronous rectifiers in the example shown (and generally throughout this disclosure) are MOSFETs with parallel diodes, but alternative switching elements may be used within the scope of the present invention.

Active rectifier control circuitry 12, 14, 16 includes an AC sensing circuit 12 coupled on a first end to the first and second AC input terminals $V_{AC1}$ and $V_{AC2}$ to obtain real time AC line information, a DC level shift up circuit 14 effective to apply a DC offset to the AC waveform for easy processing, and a comparator circuit 16 effective to determine whether the real time AC signal is in a positive or negative portion of the AC cycle for generating MOSFET gate drive signals.

Figure 2:
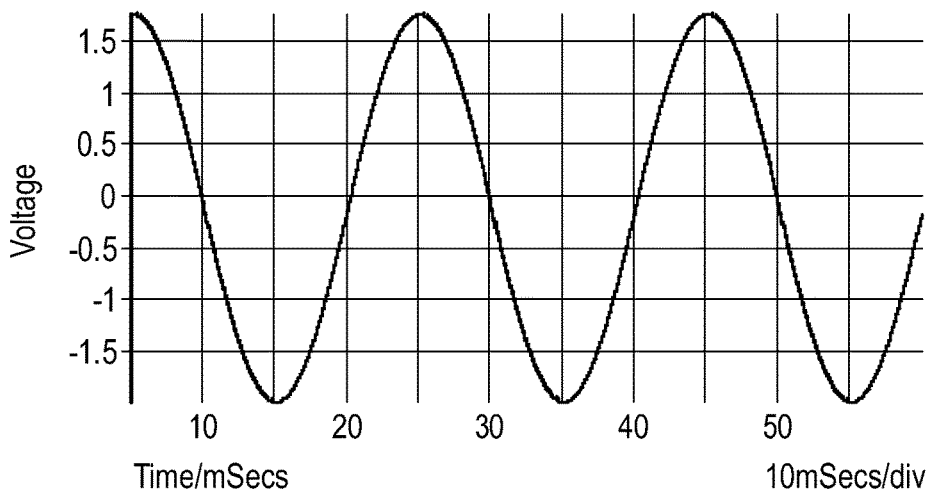
FIG. 2 is a graphical diagram illustrating an exemplary AC input waveform as sensed by the AC sensing circuit of FIG. 1.

The diagram of FIG. 2 represents a scaled down real time AC line information feed into the active rectifier control circuit 12, 14, 16.

Figure 3:
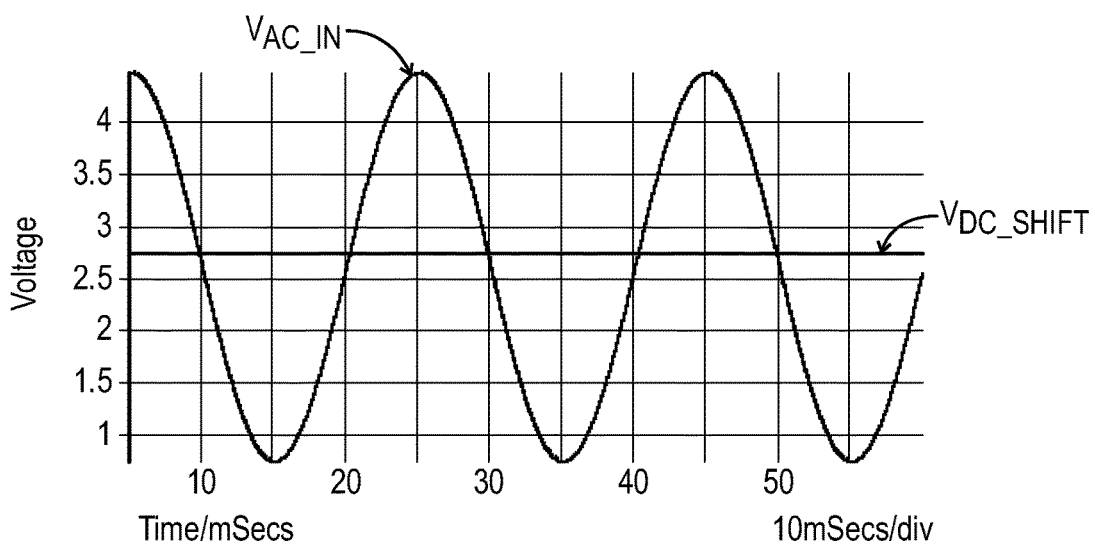
FIG. 3 is a graphical diagram illustrating the exemplary AC input waveform of FIG. 2 after operation of the DC level shift-up circuit of FIG. 1.

The diagram of FIG. 3 represents a DC voltage having been added to shift up the AC line information Vac_in to a DC signal Vdc_shift.

Figure 4:
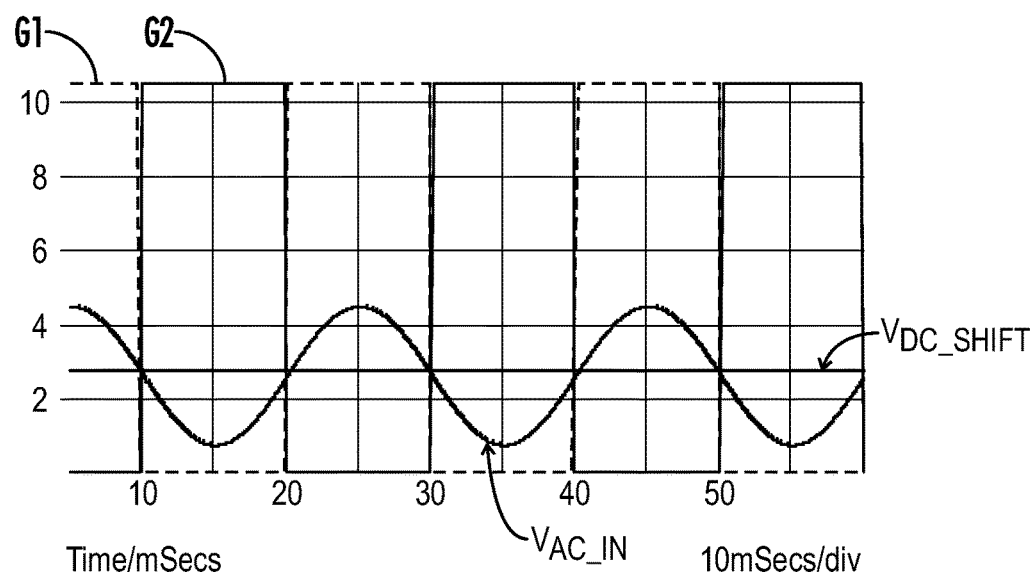
FIG. 4 is a graphical diagram illustrating exemplary gate drive signals applied corresponding to a phase of the AC waveform with respect to the DC level shift value.

The diagram of FIG. 4 represents appropriate MOSFET gate drive signals G1, G2 as generated by the comparator circuit 16 for driving parallel MOSFETs, the gate drive signals G1, G2 being alternately generated in accordance with positive and negative phases of the AC line waveform VAC_in, with respect to the DC signal $V_{DC\_SHIFT}$. Therefore, during a positive cycle of the AC input voltage sinewave, MOSFETs Q1 and Q4 are turned on and MOSFETs Q2 and Q3 are off, and the voltage drop across Q1 and Q4 is accordingly reduced. During a negative half-wave of the AC input voltage, the opposite MOSFETs Q2 and Q3 are turned on and MOSFETs Q1 and Q4 are turned off.

Figure 5:
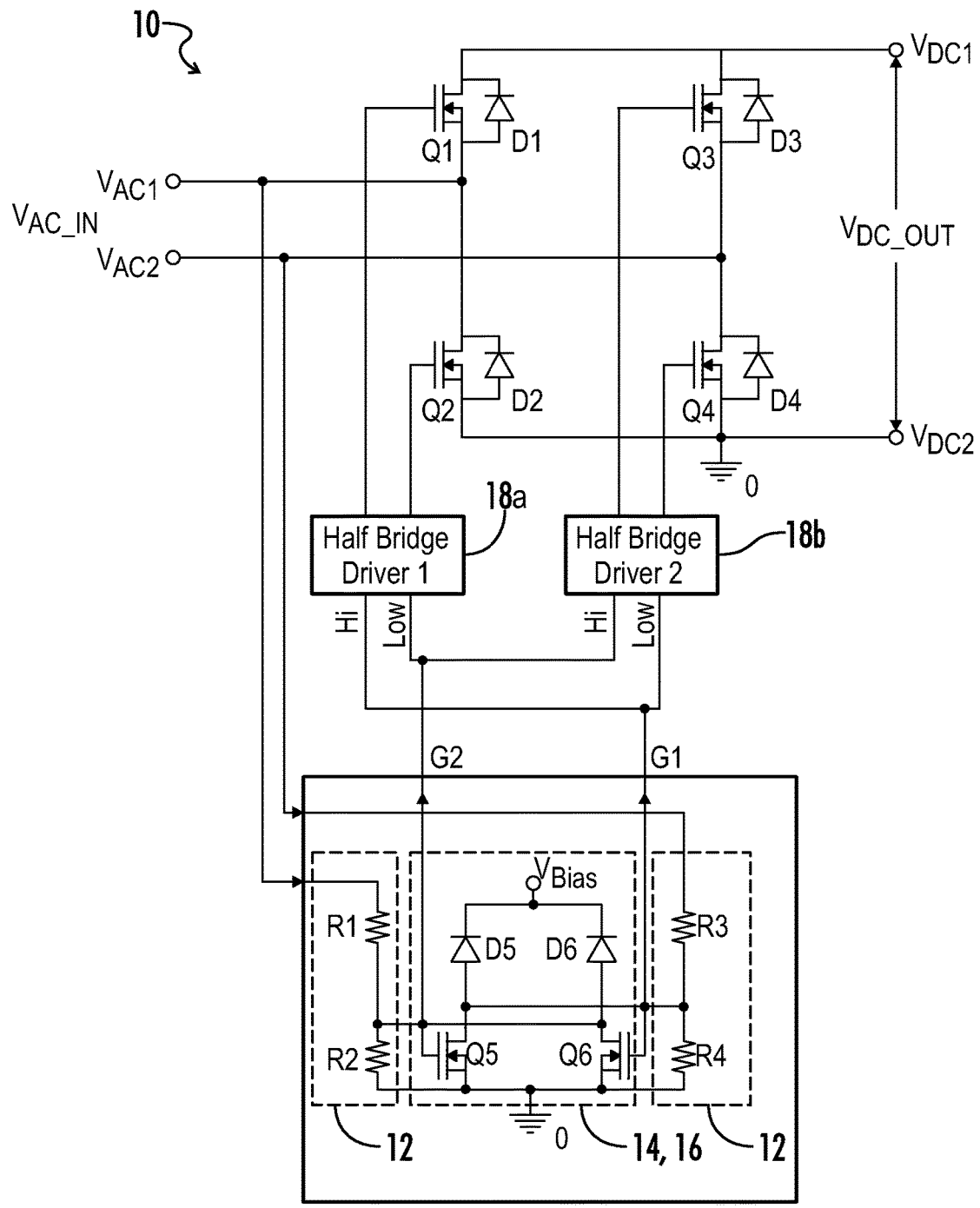
FIG. 5 is a circuit block diagram representing another exemplary embodiment of a power converter and active bridge control circuitry of the present invention.

Referring now to FIG. 5, a more particular example of the active bridge control circuitry 12, 14, 16 and an associated operation of the power converter 10 may now be described. First and second resistors R1, R2 are coupled in series between the second AC input terminal $V_{AC2}$ and circuit ground 0, and third and fourth resistors R3, R4 are coupled in series between the first AC input terminal $V_{AC1}$ and ground 0. A switching element Q5 has its source coupled to ground 0 and its drain coupled to an anode of a diode D5, the cathode of diode D5 being coupled to a biasing DC voltage source V_Bias. Another switching element Q6 has its source coupled to ground 0 and its drain coupled to an anode of diode D6, the cathode of diode D6 being coupled to the biasing DC voltage source V_Bias. The gate of switching element Q5 and the drain of switching element Q6 are coupled to a node between the first and second resistors R1, R2. The gate of switching element Q6 and the drain of switching element Q5 are coupled to a node between the third and fourth resistors R3, R4.

In the embodiment described, resistors R1-R4 form an AC sensing circuit 12, while the switching elements Q5, Q6 and diodes D5, D6 form DC level shift up and comparator circuits 14, 16. The switching elements Q5, Q6 may be small signal MOSFETs with threshold voltages of about 3V.

Figure 6A:
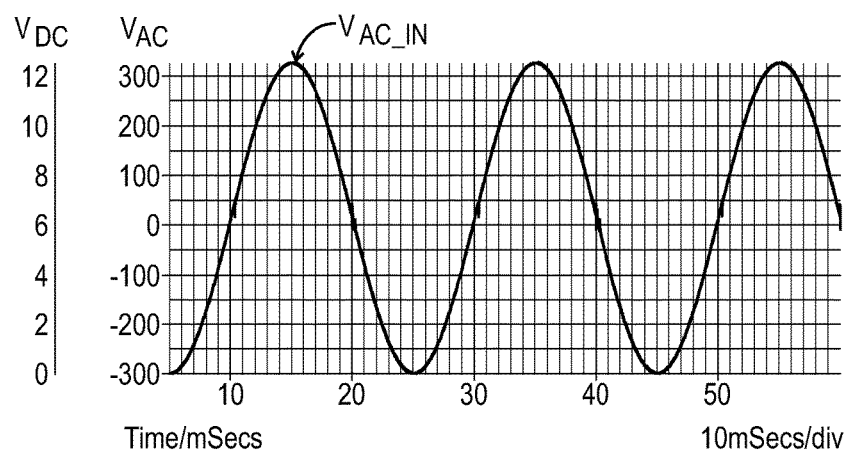
FIGS. 6A, 6B and 6C are graphical diagrams illustrating an AC input voltage waveform and first and second gate drive signals, respectively, in an exemplary operation of the power converter of FIG. 5.
Figure 6B:
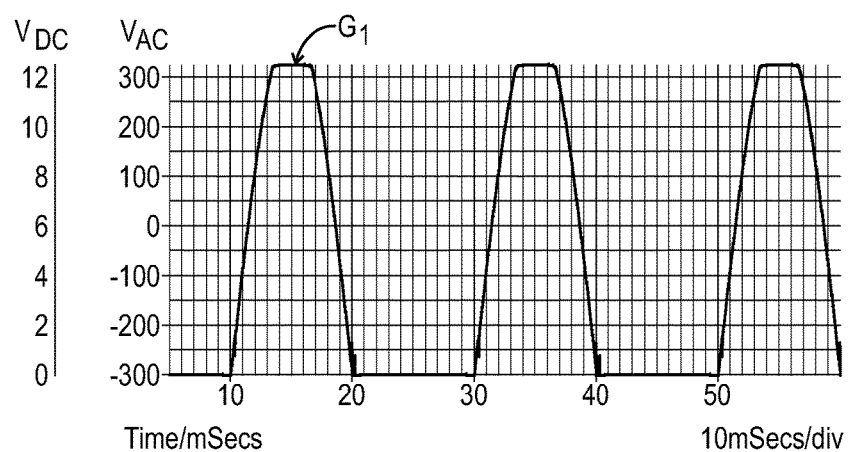
Figure 6C:
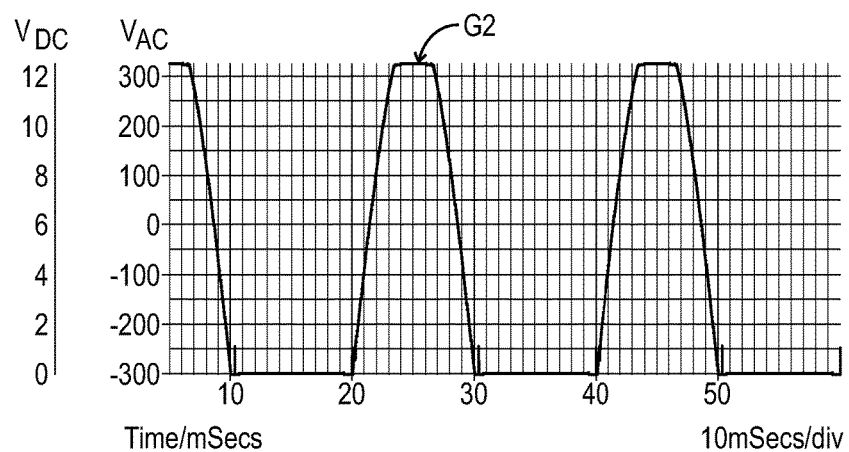

Referring now to FIGS. 6A, 6B and 6C, during a positive half-wave of the AC input signal $V_{AC}$_in, through the voltage divider formed by resistors R3, R4 the switching element Q6 is turned on and switching element Q5 is turned off. In this case, the signal G2 is pulled low and the signal G1 is pulled high. A first half-bridge driver 18a and a second half-bridge driver 18b are coupled to the first active rectifier bridge and the second active rectifier bridge, respectively, and are effective to generate drive signals in response to G1 and G2 wherein switching elements Q1 and Q4 are turned on and switching elements Q2 and Q3 are turned off.

Otherwise, during a negative half-wave of the AC input signal $V_{AC}$ in, through the voltage divider formed by resistors R1, R2, the switching element Q5 is turned on and switching element Q6 is turned off. The signal G1 is now pulled low and the signal G2 is high. The first half bridge driver 18a and the second half bridge driver 18b generate drive signals in response to G1 and G2 wherein switching elements Q2 and Q3 are turned on and switching elements Q1 and Q4 are turned off.

Figure 7:
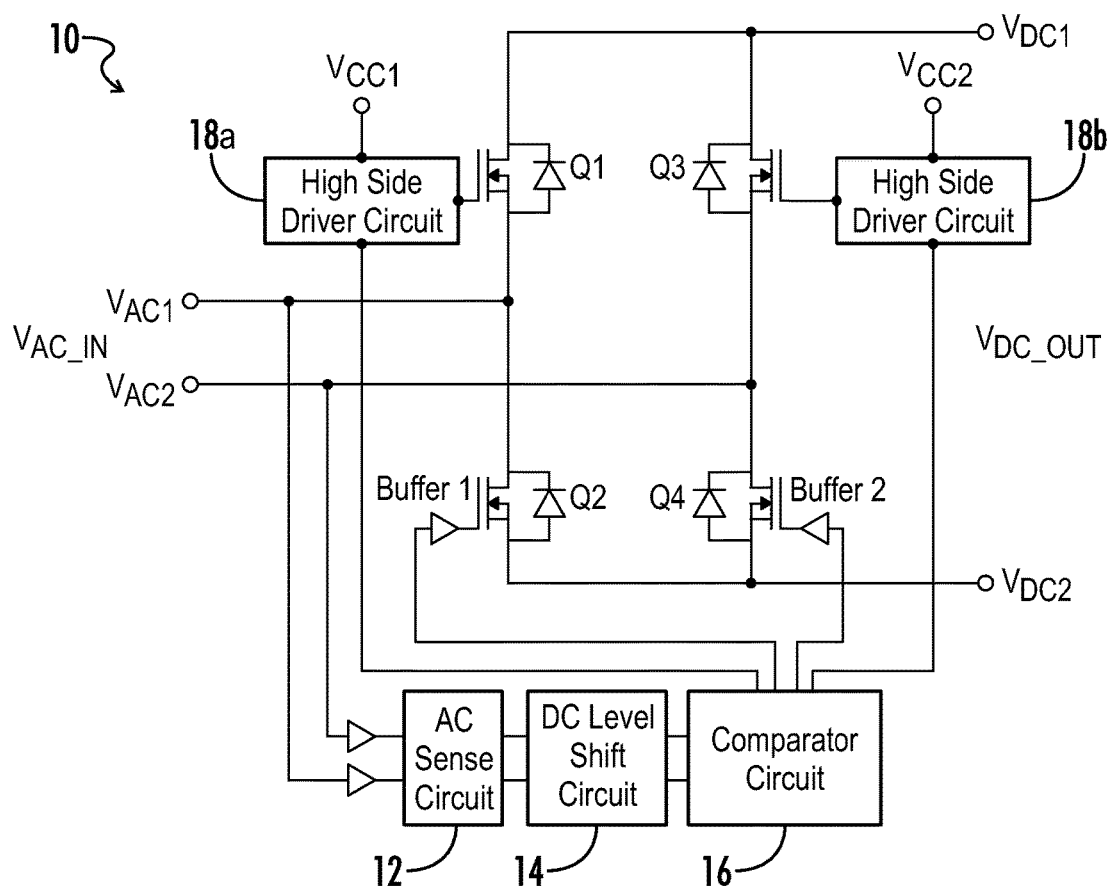
FIG. 7 is a circuit block diagram representing another exemplary embodiment of a power converter and active bridge control circuitry of the present invention.

Referring now to FIG. 7, in another embodiment the first and second half bridge driver circuits 18a, 18b of the power converter 10 are replaced with a first high side driver circuit 18a coupled to the gate of switching element Q1, a second high side driver circuit 18b coupled to the gate of switching element Q3, a first buffer driver circuit coupled to the gate of switching element Q2, and a second buffer driver circuit coupled to the gate of switching element Q4.

Figure 8:
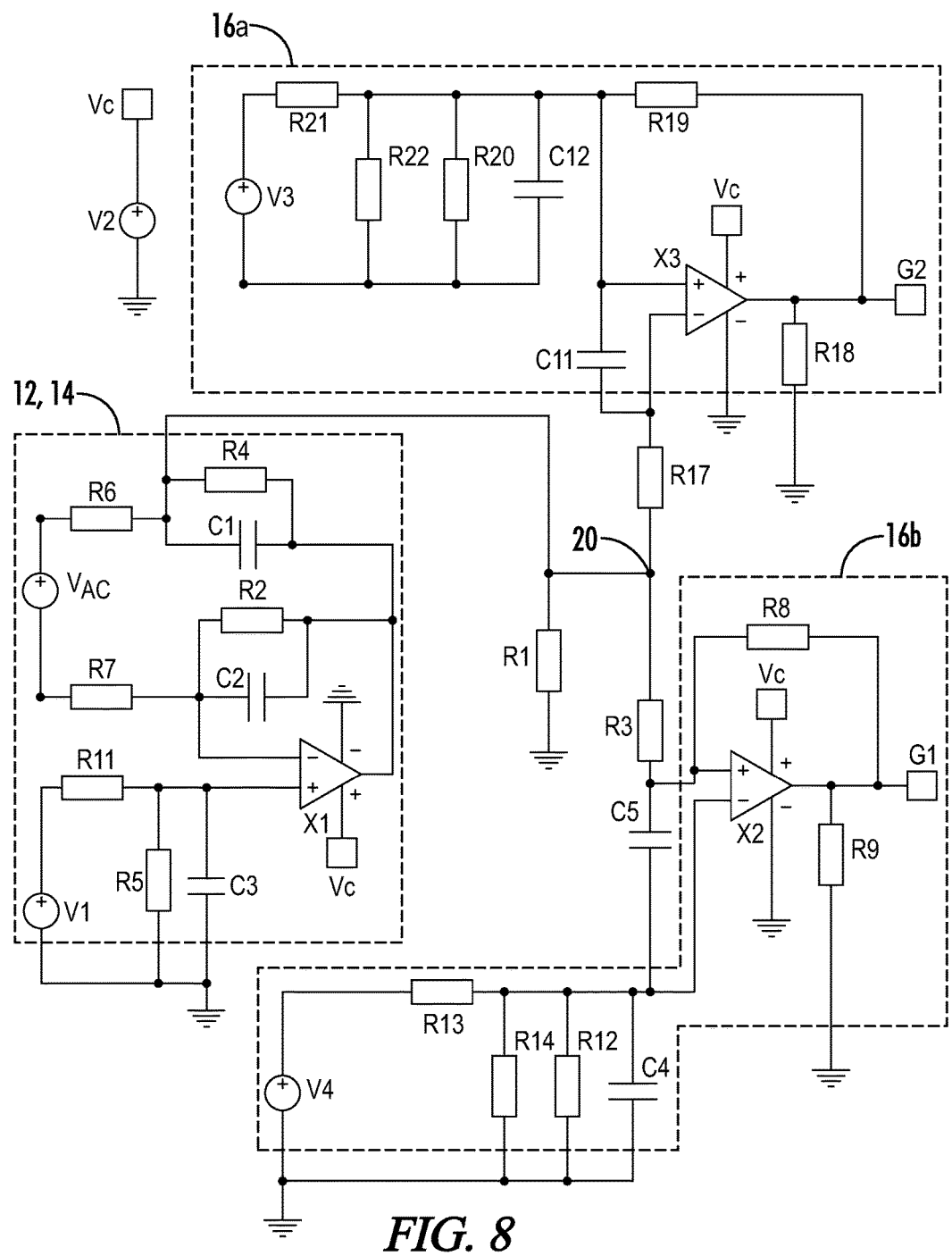
FIG. 8 is a circuit block diagram representing an embodiment of an AC sensing circuit, DC level shifting circuit and comparator circuit for the power converter of FIG. 7.

In an embodiment the AC sensing circuit 12 and the DC level shift up circuit 14 may have a structure as represented in FIG. 8. Resistors R6 and R7 are coupled to first and second AC input terminals (i.e., opposing ends of an AC input source Vac). A first RC circuit of resistor R4 and capacitor C1 are coupled in parallel with each other and further coupled on a first end to resistor R6. A second RC circuit of resistor R2 and capacitor C2 are coupled in parallel with each other and further coupled on a first end to resistor R7 and on a second end to a second end of the first RC circuit. A third RC circuit of resistor R5 and capacitor C3 are coupled in parallel with each other and further coupled on a first end to a voltage source V1 via resistor R11, and coupled on a second end to circuit ground. The first end of the third RC circuit is coupled to the non-inverting input (+) of an operational amplifier X1, while the first end of the second RC circuit is coupled to the inverting input (−) of the operational amplifier X1.

Accordingly, a DC biasing voltage is added to the AC signal, effectively shifting up the DC level of the AC wave. A resulting AC wave with DC offset is provided at node 20.

In the embodiment represented in FIG. 8, first and second comparator circuits 16a, 16b are implemented to generate drive signals G2, G1, respectively.

Regarding the first comparator circuit 16a, node 20 is coupled as an input voltage via resistor R17 to the inverting input (−) of an operational amplifier X3. The non-inverting input (+) of operational amplifier X3 is coupled to biasing voltage source V3 via a network of resistors R21, R22, R20 and capacitor C12. When the input signal (the AC waveform with DC offset at node 20) at the inverting input of the operational amplifier X3 is greater than a reference voltage at the non-inverting input (generally corresponding to a positive half-wave of the AC waveform with respect to the DC offset value where for example the DC offset value is roughly equivalent to the bias voltage), gate drive signal G2 is LOW. Alternatively, when the input signal is less than the reference voltage (generally corresponding to a negative half-wave of the AC waveform with respect to the DC offset value), gate drive signal G2 is HIGH.

For the second comparator circuit 16b the node 20 is coupled as an input voltage via resistor R3 to the non-inverting input (+) of operational amplifier X2. The inverting input (−) of operational amplifier X2 is coupled to biasing voltage source V4 via a network of resistors R13, R14, R12 and capacitor C4. When the input signal (the AC waveform with DC offset at node 20) at the non-inverting input of the operational amplifier X2 is greater than a reference voltage at the non-inverting input, gate drive signal G1 is HIGH. Alternatively, when the input signal is less than the reference voltage, gate drive signal G1 is LOW.

Figure 9:
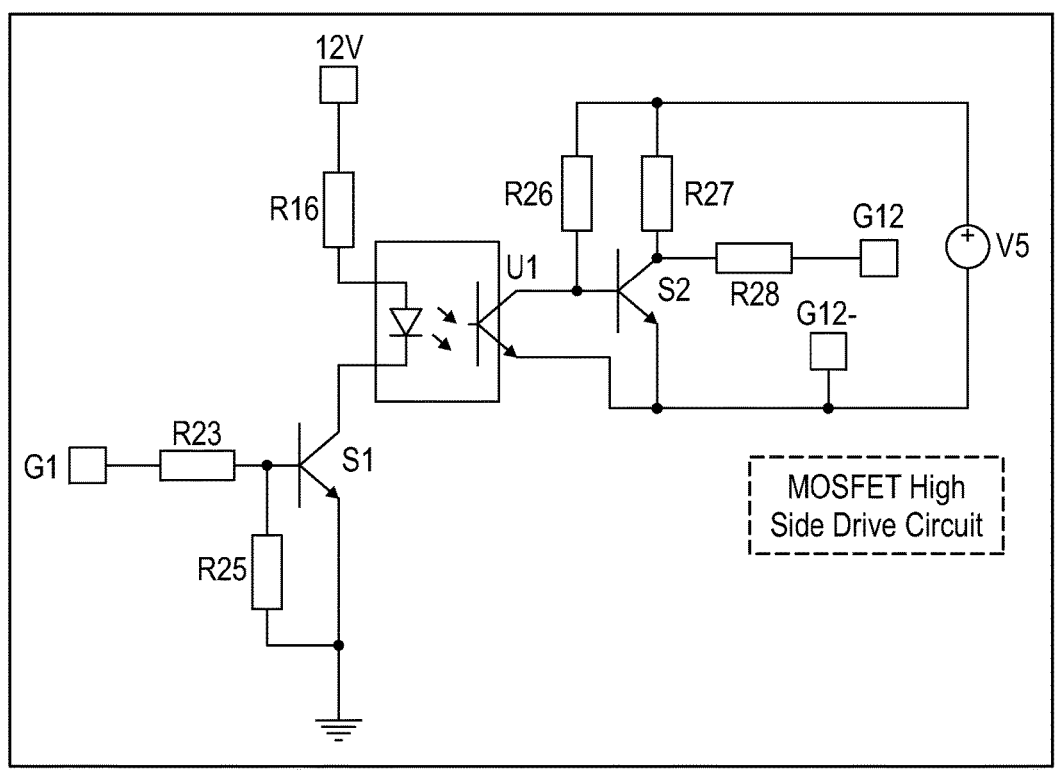
FIG. 9 is a circuit block diagram representing an embodiment of a high-side gate drive circuit for the power converter of FIG. 7.

In an embodiment the high side driver circuit 18a generally represented in FIG. 7 may have an exemplary structure as shown in FIG. 9 for electrical isolation between an input end coupled to the comparator circuits 16a, 16b and an output end coupled to the high side synchronous rectifiers Q1, Q3. In the embodiment shown, a drive signal G1 is provided to the gate of a first transistor S1 via resistive network R23, R25. When the drive signal G1 is HIGH, the transistor S1 is turned on and a first biasing voltage (e.g., 12V) is conducted across the light emitter of an opto-coupler or equivalent isolation circuit U1, wherein a corresponding phototransistor is turned on. When the phototransistor is turned on, voltage from a second biasing voltage source V5 is conducted to the control terminal of a second transistor S2 and the second transistor S2 is turned on to further generate an output signal G12 as a gate drive signal to the corresponding MOSFET rectifier Q1.

It may be understood that although not shown, an equivalent high side driver circuit 18a may be provided for receiving the drive signal G2, wherein an output signal G22 is generated as a gate drive signal to the corresponding MOSFET rectifier Q3.

Figure 10:
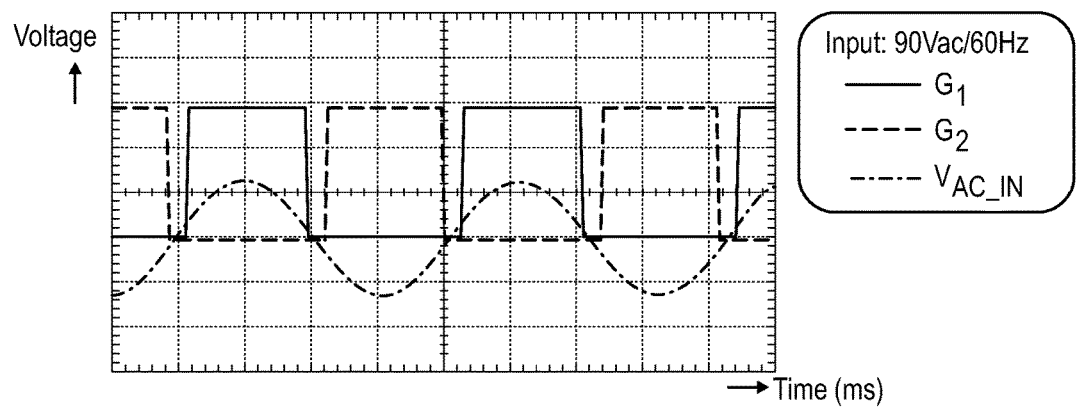
FIGS. 10 and 11 are graphical diagrams illustrating an AC input voltage waveform and first and second gate drive signals in exemplary operations of the power converter of FIG. 7.
Figure 11:
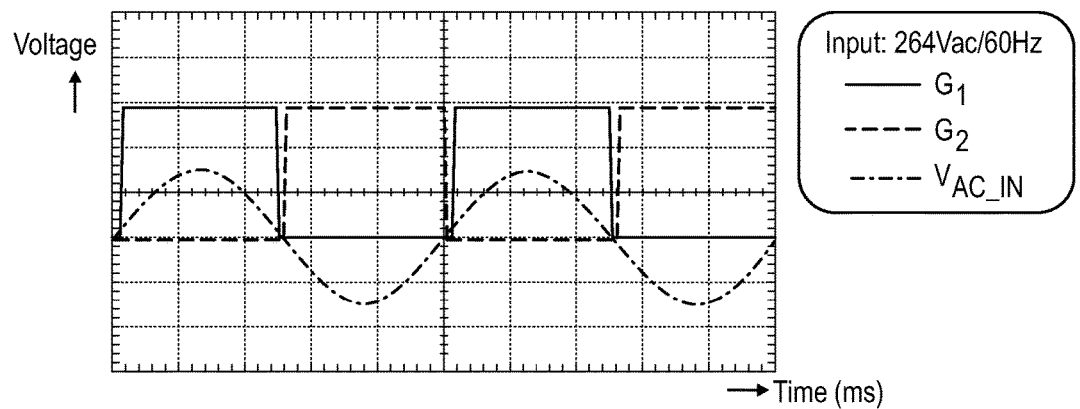

In FIGS. 10 and 11, exemplary results may be seen for an experimental operation of the power converter with active rectifier control circuitry in an embodiment as represented in FIGS. 7-9.

Figure 12:
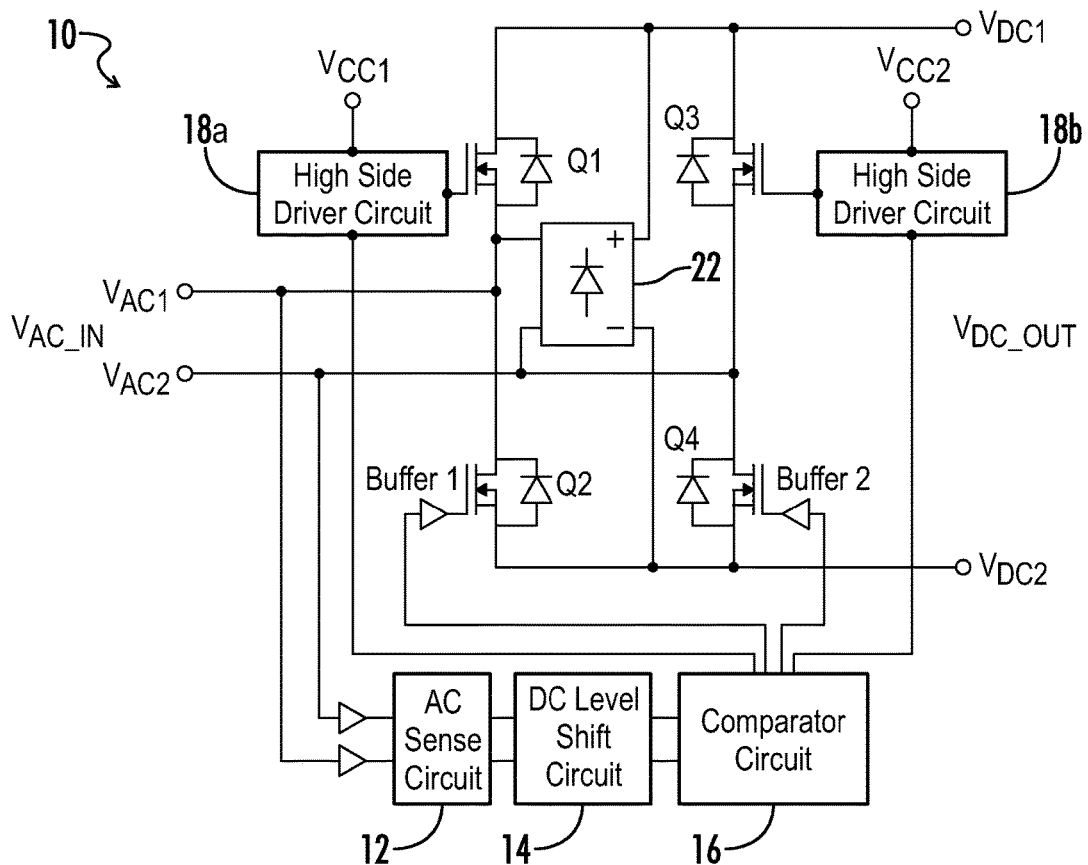
FIG. 12 is a circuit block diagram representing another exemplary embodiment of a power converter and active bridge control circuitry of the present invention.

Referring now to FIG. 12, in another embodiment a conventional diode bridge rectifier 22 may within the scope of the present invention be further coupled in parallel with the active rectifier circuit. In the example shown, the circuit configuration and operation may otherwise match the description above with respect to the embodiments in FIGS. 7-9.

The previous detailed description has been provided for the purposes of illustration and description. Thus, although there have been described particular embodiments of the present invention of a new and useful "Power Converter with Self-Driven Synchronous Rectifier Control Circuitry," it is not intended that such references be construed as limitations upon the scope of this invention except as set forth in the following claims.

What is claimed is:
1. A power converter comprising:
 a first AC input terminal coupled between first and second synchronous rectifier switching elements, the first and second synchronous rectifier switching elements coupled across first and second DC output terminals;
 a second AC input terminal coupled between third and fourth synchronous rectifier switching elements, the third and fourth synchronous rectifier switching elements coupled across the first and second DC output terminals;
 an AC input sensing circuit;
 a DC level shifting circuit effective to apply a DC offset to an AC input signal received via the sensing circuit; and
 switching control circuitry coupled to receive the AC input signal with the DC offset and comprising a first comparator circuit effective to compare the AC input signal with the DC offset to a first reference voltage and to generate a first control signal for turning on the first and fourth switching elements when the input signal is greater than the first reference voltage, and a second comparator circuit effective to compare the AC input signal with the DC offset to a second reference voltage and to generate a second control signal for turning on the second and third switching elements when the input signal is less than the second reference voltage.

2. The power converter of claim 1, wherein the positive half cycle and the negative half cycle of the AC input signal are defined with respect to the DC offset.

3. The power converter of claim 1, the synchronous rectifier switching elements comprising MOSFET rectifiers.

4. The power converter of claim 3, the synchronous rectifier switching elements further comprising parallel diodes.

5. The power converter of claim 1, wherein the first and second reference voltages are substantially equal to the DC offset.

6. The power converter of claim 1, further comprising a first high side driver circuit effective to receive the first control signal and to generate an electrically isolated gate drive signal for turning on the first switching element, and a second high side driver circuit effective to receive the second control signal and to generate an electrically isolated gate drive signal for turning on the third switching element.

7. The power converter of claim 6, further comprising a first buffer drive circuit coupled to receive the first control signal and to generate a gate drive signal for turning on the fourth switching element, and a second buffer drive circuit coupled to receive the second control signal and to generate a gate drive signal for turning on the second switching element.

8. A power converter comprising:
a first AC input terminal coupled between first and second synchronous rectifier switching elements, the first and second synchronous rectifier switching elements coupled across first and second DC output terminals;
a second AC input terminal coupled between third and fourth synchronous rectifier switching elements, the third and fourth synchronous rectifier switching elements coupled across the first and second DC output terminals;
an AC input sensing circuit;
a first comparator switching element coupled to the sensing circuit and configured to be turned on during a positive half cycle of the AC input signal;
a second comparator switching element coupled to the sensing circuit and configured to be turned on during a negative half cycle of the AC input signal;
a first driver circuit effective to generate drive signals to turn on and off the first and second synchronous rectifier switching elements in accordance with on-states of the first and second comparator switching elements, respectively; and
a second driver circuit effective to generate drive signals to turn on and off the third and fourth synchronous rectifier switching elements in accordance with on-states of the second and first comparator switching elements, respectively.

9. The power converter of claim 8, wherein a threshold value for the comparator switching elements defines a DC offset for referencing the positive and negative half cycles of the AC input signal.

10. The power converter of claim 8, the synchronous rectifier switching elements and the comparator switching elements comprising MOSFETs.

11. The power converter of claim 10, the synchronous rectifier switching elements further comprising parallel diodes.

12. The power converter of claim 8, the AC input sensing circuit comprising a first pair of resistors coupled on a first end to the first AC input terminal and on a second end to circuit ground, and a second pair of resistors coupled on a first end to the second AC input terminal and on a second end to circuit ground.

13. The power converter of claim 12, the first comparator switching element having a source terminal coupled to circuit ground and a gate terminal coupled to a drain terminal of the second comparator switching element and further to a node between the second pair of resistors, and the second comparator switching element having a source terminal coupled to circuit ground and a gate terminal coupled to a drain terminal of the first comparator switching element and further to a node between the first pair of resistors.

14. The power converter of claim 8, further comprising a diode bridge rectifier coupled on a first end between the AC input terminals and on a second end between the first and second DC output terminals.

* * * * *